United States Patent
Koda et al.

(10) Patent No.: US 10,184,602 B2
(45) Date of Patent: Jan. 22, 2019

(54) CONNECTING PIPING AND STEAM TURBINE SYSTEM

(71) Applicant: MITSUBISHI HEAVY INDUSTRIES COMPRESSOR CORPORATION, Tokyo (JP)

(72) Inventors: Takuro Koda, Hiroshima (JP); Jumpei Nishioka, Hiroshima (JP); Kenichi Nishiyama, Hiroshima (JP); Hiroaki Usui, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 470 days.

(21) Appl. No.: 14/766,378

(22) PCT Filed: Feb. 15, 2013

(86) PCT No.: PCT/JP2013/053765
§ 371 (c)(1),
(2) Date: Aug. 6, 2015

(87) PCT Pub. No.: WO2014/125634
PCT Pub. Date: Aug. 21, 2014

(65) Prior Publication Data
US 2015/0377395 A1    Dec. 31, 2015

(51) Int. Cl.
*F16L 27/11* (2006.01)
*F01D 25/32* (2006.01)
(Continued)

(52) U.S. Cl.
CPC .............. *F16L 27/11* (2013.01); *F01D 25/32* (2013.01); *F01K 9/00* (2013.01); *F01K 9/003* (2013.01); *F01K 11/02* (2013.01); *F16L 51/025* (2013.01)

(58) Field of Classification Search
CPC . F01D 25/32; F01K 9/00; F01K 11/02; F01K 9/003; F16L 27/11; F16L 51/025
See application file for complete search history.

(56) References Cited

U.S. PATENT DOCUMENTS 2,960,354 A    11/1960  Addie et al.
3,976,312 A  *  8/1976  Murphree ............. F16L 51/027
                                                    285/45
(Continued)

FOREIGN PATENT DOCUMENTS

CN       2388352 Y     7/2000
CN     101052833 A    10/2007
(Continued)

OTHER PUBLICATIONS

DE 19523506 A1 English.*
(Continued)

*Primary Examiner* — Mark Laurenzi
*Assistant Examiner* — Shafiq Mian
(74) *Attorney, Agent, or Firm* — Birch, Stewart, Kolasch & Birch, LLP

(57) ABSTRACT

The present invention is provided with: a cylindrical main body section that is provided with at least one annular rib on the outer circumferential surface; and a deforming section that is configured from a bellows that can be deformed in an axis line direction and diameter direction.

7 Claims, 4 Drawing Sheets

(51) Int. Cl.
  *F01K 9/00* (2006.01)
  *F16L 51/02* (2006.01)
  *F01K 11/02* (2006.01)

(56) References Cited

U.S. PATENT DOCUMENTS

| | | | | |
|---|---|---|---|---|
| 4,192,143 | A * | 3/1980 | Haegele | F01N 13/1811 285/114 |
| 4,315,558 | A * | 2/1982 | Katayama | F01N 13/1816 138/120 |
| 4,635,533 | A * | 1/1987 | Whiteside, II | F16L 51/035 285/187 |
| 4,958,860 | A * | 9/1990 | Akitsu | F16L 27/1012 285/114 |
| 5,043,797 | A * | 8/1991 | Lopes | H01L 23/473 165/104.33 |
| 5,069,487 | A * | 12/1991 | Sheppard | F01N 13/1811 285/123.1 |
| 5,340,165 | A * | 8/1994 | Sheppard | F01N 13/1811 285/226 |
| 5,354,104 | A * | 10/1994 | Senes | F16L 27/08 285/223 |
| 5,791,696 | A * | 8/1998 | Miyajima | F16L 11/11 285/222.1 |
| 5,944,363 | A * | 8/1999 | Cwik | F01N 13/1811 285/226 |
| 5,961,244 | A | 10/1999 | Hahn | |
| 6,032,463 | A * | 3/2000 | Bock | F01N 13/10 285/226 |
| 6,230,748 | B1 * | 5/2001 | Krawietz | F01N 13/1816 138/114 |
| 6,880,861 | B2 * | 4/2005 | Muroi | F16L 27/11 285/226 |
| 6,884,398 | B1 * | 4/2005 | Biel, Jr. | B01D 53/9454 422/179 |
| 6,921,112 | B2 * | 7/2005 | Atansoski | F01N 13/1811 285/226 |
| 7,066,495 | B2 * | 6/2006 | Thomas | F01N 13/1816 285/226 |
| 7,264,280 | B2 * | 9/2007 | Kim | F01N 13/1816 285/226 |
| 7,650,912 | B2 * | 1/2010 | Kim | F01N 13/1816 138/121 |
| 9,009,972 | B2 * | 4/2015 | Stalcup, II | F01N 13/1816 29/890.08 |
| 9,512,772 | B2 * | 12/2016 | Lucky | F01N 13/143 |
| 9,926,890 | B2 * | 3/2018 | Lindberg | F16L 51/025 |
| 2006/0266049 | A1 | 11/2006 | Storage et al. | |
| 2011/0014031 | A1 | 1/2011 | Kawashita et al. | |
| 2014/0008909 | A1 * | 1/2014 | D'Orazio | F16L 19/025 285/91 |

FOREIGN PATENT DOCUMENTS

| | | | |
|---|---|---|---|
| CN | 200967995 Y | 10/2007 | |
| DE | 195 23 506 A1 | 1/1997 | |
| JP | 56-10016 A | 2/1981 | |
| JP | 60-43105 A | 3/1985 | |
| JP | 2-44193 U | 3/1990 | |
| JP | 04-211787 A | 8/1992 | |
| JP | 10-141565 A | 5/1998 | |
| JP | 10-196313 A | 7/1998 | |
| JP | 11-93617 A | 4/1999 | |
| JP | 2002-235538 A | 8/2002 | |
| JP | 2007-023962 A | 2/2007 | |
| JP | 2007-177999 A | 7/2007 | |
| WO | WO 2012095886 A2 * | 7/2012 | F16L 19/025 |
| WO | WO 2012/132640 A1 | 10/2012 | |

OTHER PUBLICATIONS

International Search Report dated Apr. 23, 2013 for PCT Application No. PCT/JP2013/053765.
Written Opinion dated Apr. 23, 2013 issued in PCT Application No. PCT/JP2013/053765 with an English Translation.
Chinese Office Action dated Aug. 8, 2016 in Counter part Application No. 201380071770.9 with an English Translation.
Japanese Office Action dated Oct. 4, 2016 in JP Application No. 2015-500070 with an English Translation.
Chinese Office Action and Search Report dated Jan. 4, 2016 for Application No. 201380071770.9 with an English translation thereof.
Extended European Search Report dated Jan. 18, 2016 for Application No. 13875244.9.

* cited by examiner

CONNECTING PIPING AND STEAM TURBINE SYSTEM

TECHNICAL FIELD

The present invention relates to a connecting piping and a steam turbine system.

BACKGROUND ART

Among connecting pipings in which two parts are connected together, there are some connecting pipings that require a structure in which the relative displacement between positions for connection to the two parts is absorbed. For example, there is a connecting piping in which a steam turbine and a condenser are connected together in a steam turbine system. The thermal expansion states of the steam turbine and the condenser change, respectively, and the positions of the stream turbine and the condenser for connection to the connecting piping are displaced. Hence, connecting pipings capable of absorbing such displacement are used for the steam turbine system. For example, PTL 1 discloses a connecting piping in which a condenser is provided with a tubular body having bellows between a connecting flange section connected to a steam turbine, and a main body.

CITATION LIST

Patent Literature

[PTL 1] Japanese Unexamined Patent Application Publication No. 10-196313

SUMMARY OF INVENTION

Technical Problem

In the connecting piping using the bellows, cost increases when a certain degree of length is required.

The invention has been made in view of the above circumstances, and an object thereof is to provide a connecting piping and a steam turbine system that can suppress cost increase.

Solution to Problem

According to a first aspect of the invention, there is provided a connecting piping including a tubular main body section that is provided with at least one annular rib on an outer circumferential surface; and a deformable section that is configured from a bellows that is deformable in an axis line direction and a diameter direction.

According to a second aspect of the invention, in the connecting piping of the first aspect, the deformable section may be configured such that a plurality of the bellows overlap each other in the diameter direction.

According to a third aspect of the invention, in the connecting piping of the first aspect or the second aspect, the deformable sections may be provided on both sides of the main body section.

According to a fourth aspect of the invention, in the connecting piping of any one of the first aspect to the thirds aspect, a tubular flow guide may be provided inside the deformable section.

According to a fifth aspect of the invention, in the connecting piping of the fourth aspect, the flow guide may be only fixed to a connecting piping main body including the main body section and the deformable section on only one side in an axial direction.

A steam turbine system having the connecting piping according to any one of Claims 1 to 5, the steam turbine system including a steam turbine, and a condenser into which steam discharged from the steam turbine flows, and the steam turbine and the condenser are connected together by the connecting piping.

Advantageous Effects of Invention

According to the connecting piping related to the above aspect of the invention, cost increase can be suppressed. Additionally, the weight of the main body section can be reduced while ensuring the rigidity thereof using a rib.

DESCRIPTION OF EMBODIMENTS

Hereinafter, a connecting piping 10 and a steam turbine system 11 related to an embodiment of the invention will be described. The steam turbine system 11 related to the present embodiment is mounted on, specifically, vessels and marine structures (hereinafter both are referred to as marine structures).

Figure 1:
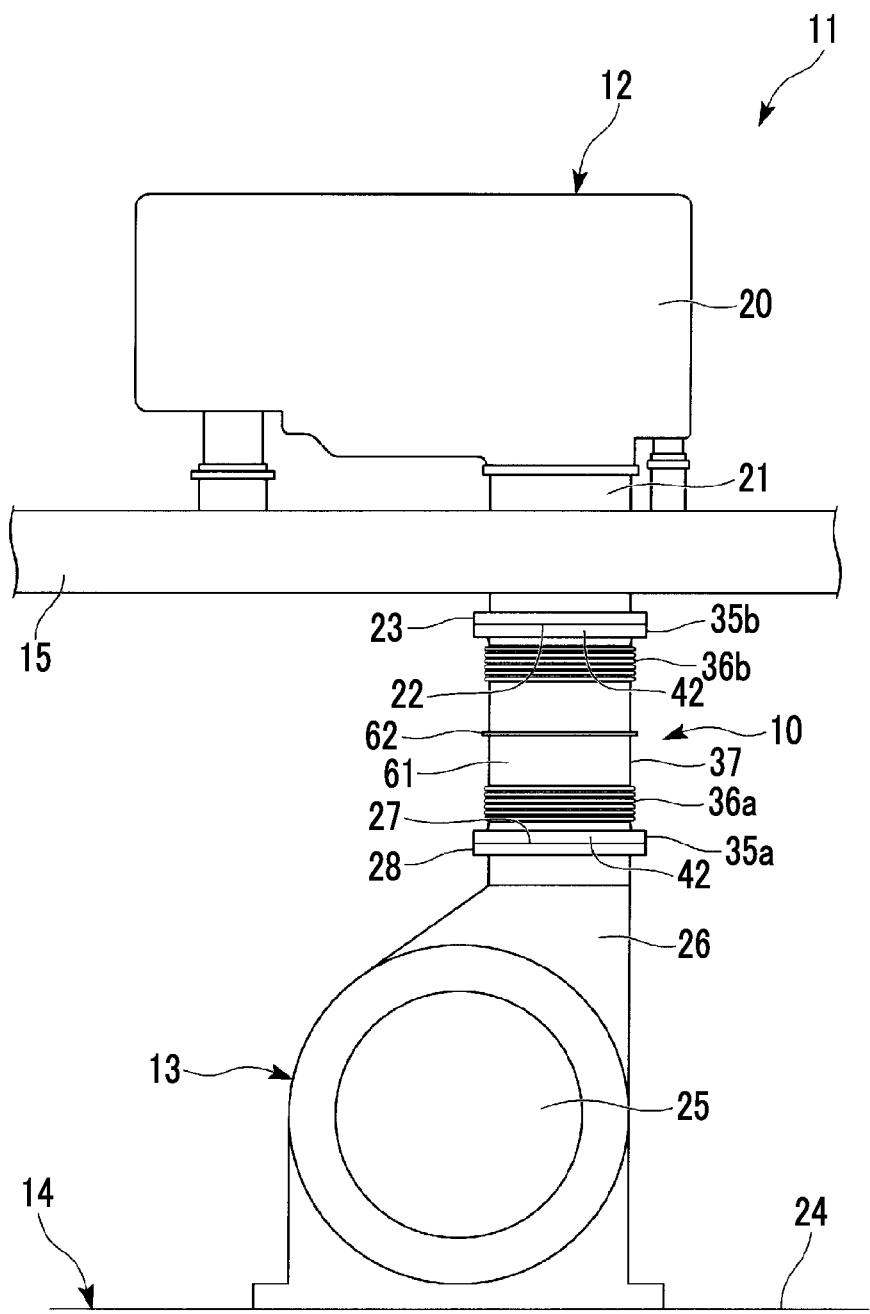
FIG. 1 is a front view illustrating a connecting piping and a steam turbine system related to an embodiment of the invention.

FIG. 1 illustrates a steam turbine system 11 related to the present embodiment. The steam turbine system 11 has a steam turbine 12, a condenser 13, and a connecting piping 10. The steam turbine 12 is attached to a platform section 15 installed in a ship hull 14. The platform section 15 is made of I-shaped mold steel. The steam turbine 12 has a turbine main body 20 that is rotationally driven with high-temperature high-pressure steam supplied from the boiler (not illustrated), and a turbine duct 21 that exhausts the steam from the turbine main body 20. The turbine duct 21 extends downward from the turbine main body 20, and a lower end thereof serves as an outlet section 22. The outlet section 22 is provided with a connecting flange section 23. The connecting flange section 23 is horizontally arranged.

The condenser 13 is arranged below the steam turbine 12 and is installed, for example, at a ship bottom 24 of the ship hull 14. The steam discharged from the steam turbine 12 flows into the condenser 13. The condenser 13 has a condenser main body 25 that returns the steam into low-pressure water, and a condenser duct 26 that receives the steam exhausted from the steam turbine 12. The condenser duct 26 extends upward from the condenser main body 25, and an upper end thereof serves as an inlet section 27. The inlet section 27 is provided with a connecting flange section 28. The connecting flange section 28 is also horizontally arranged.

Here, the connecting flange section 23 of the turbine duct 21 and the connecting flange section 28 of the condenser duct 26 are arranged so as to be vertically separated from each other such that the positions thereof in the horizontal direction are aligned with each other. Both ends of the connecting piping 10 related to the present embodiment are connected to the connecting flange section 23 and the connecting flange section 28. Accordingly, the connecting piping 10 connects the outlet section 22 of the turbine duct 21 with the inlet section 27 of the condenser duct 26.

Figure 2:
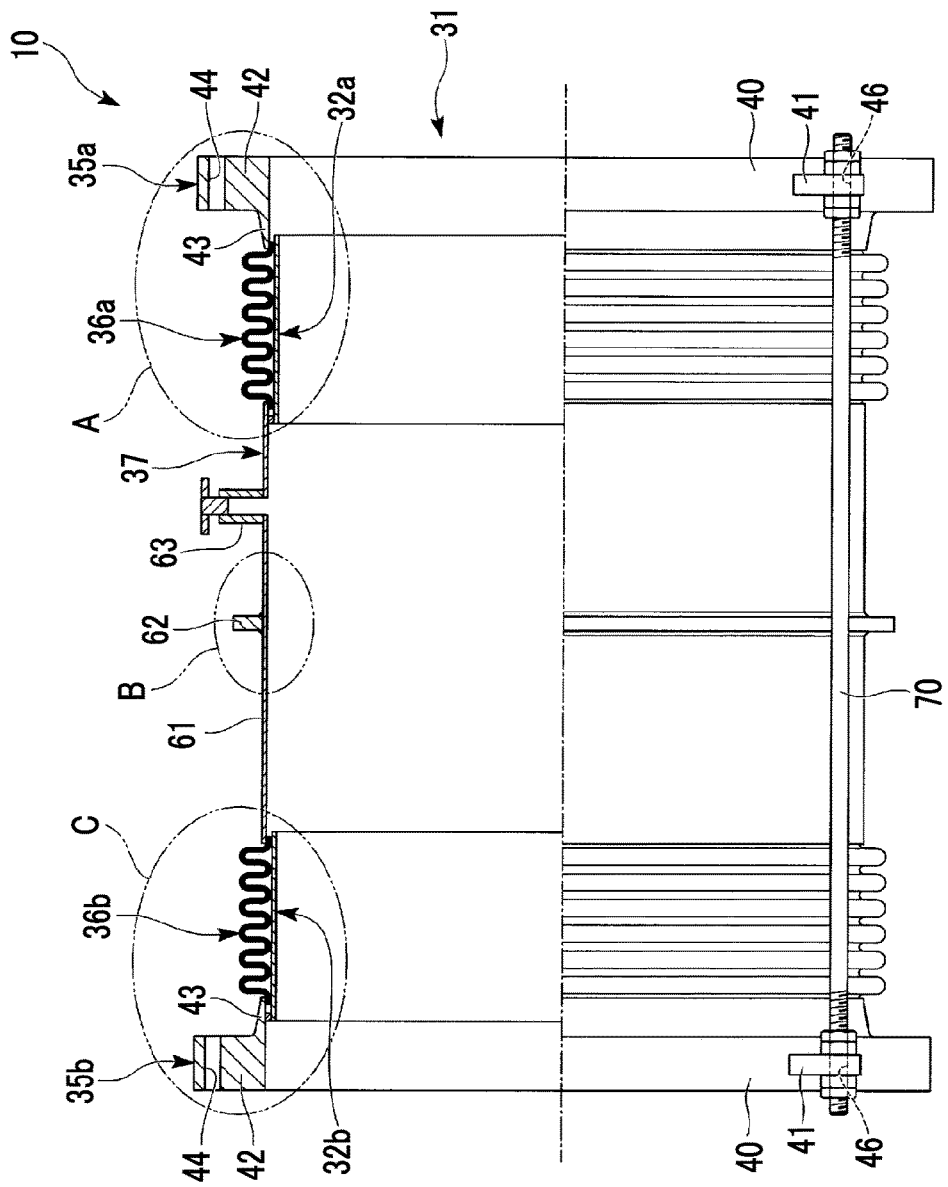
FIG. 2 is a front view illustrating the connecting piping related to the embodiment with half of the connecting piping cut from the center thereof being in cross-section.

As illustrated in FIG. 2, the connecting piping 10 has a connecting piping main body 31 and a pair of flow guides 32a and 32b. The connecting piping main body 31 includes a pair of connecting sections 35a and 35b, a pair of deformable sections 36a and 36b, and a main body section 37.

Figure 3:
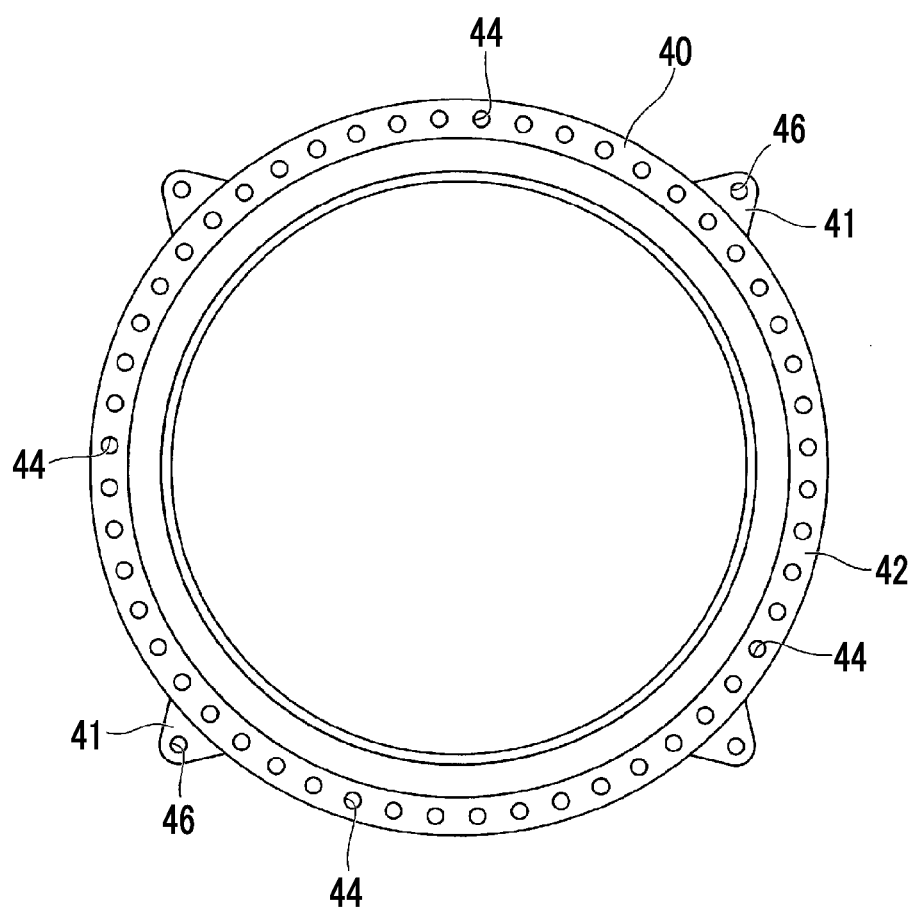
FIG. 3 is a side view illustrating the connecting piping related to the embodiment.

The pair of connecting sections 35a and 35b, form the same shape, and as illustrated in FIG. 3, have a connecting section main body 40 and a plurality of fixing plate sections 41 (four places in the illustrated example), respectively.

The connecting section main body 40 forms an annular shape. The connecting section main body 40, as illustrated in FIG. 2, has an annular connecting seat 42 formed on one side in an axial direction, and has a tubular portion 43 formed on the other side in the axial direction. As illustrated in FIG. 3, a plurality of (52 places in the illustrated example) formation of attachment holes 44 passing through the connecting seat in the axial direction are formed at equal intervals in a circumferential direction at radial intermediate positions of the connecting seat 42. As illustrated in FIG. 2, a tubular portion 43 has an external diameter smaller than the external diameter of the connecting seat 42, and protrudes in the axial direction from an inner circumferential edge portion of the connecting seat 42. The tubular portion 43 has a smaller external diameter while being separated from the connecting seat 42, and forms a tapered shape.

As illustrated in FIG. 3, the plurality of fixing plate sections 41 is attached at equal intervals in the circumferential direction of the connecting section main body 40. The fixing plate sections 41 are joined to an outer circumferential surface of the connecting seat 42 of the connecting section main body 40. Each fixing plate section 41 is formed with a fixing hole 46 passing therethrough along the axial direction of the connecting section main body 40.

The deformable sections 36a and 36b illustrated in FIG. 2 form tubular shapes. As illustrated in FIG. 4(a) and FIG. 4(c), the deformable sections 36a and 36b are respectively configured such that a plurality of (three in the illustrated example) bellows 50 to 52, which is deformable in an axis line direction and a diameter direction, overlap each other in the diameter direction. That is, the deformable sections 36a and 36b have a three-layer structure consisting of the bellows 50 on an outer layer side, the intermediate bellows 51, and the bellows on an inner layer side. The bellows 50 to 52 are integrated such that adjacent bellows are brought into close contact with each other with no gap in the diameter direction and the axial direction, and for example, both ends thereof in the axial direction are joined. The bellows 50 to 52 are made of a stainless steel material.

Each of the deformable sections 36a and 36b has a pair of joining end portions 55 and 55 and a bellows portion 56. The bellows portion 56 is provided between the pair of joining end portions 55 and 55. The joining end portions 55 and 55 have cylindrical shapes, respectively, and have external diameters which are slightly smaller than the internal diameter of the connecting section main body 40. The bellows portion 56 has a plurality of (six in the illustrated example) deformable main body portions 57, 57, . . . , and a of plurality (five in the illustrated example) coupling portions 58, 58, . . . .

The deformable main body portions 57 form annular shapes. The deformable main body portions 57, 57, . . . form shapes in which outer circumferential surfaces thereof protrude outward in the diameter direction more than outer circumferential surfaces of the joining end portions 55 and 55. Additionally, the deformable main body portions 57, 57, . . . form shapes in which inner circumferential surfaces thereof are recessed outward in the diameter direction more than inner circumferential surfaces of the joining end portions 55 and 55. The coupling portions 58, 58, . . . form tubular shapes having almost the same diameter as those the joining end portions 55 and 55. The coupling portion 58 is arranged between the deformable main body portion 57 and the deformable main body portion 57 adjacent to each other.

As illustrated in FIG. 2, the main body section 37 forms a tubular shape and has a trunk portion 61 and a rib 62. The trunk portion 61 forms a cylindrical shape and has an internal diameter slightly larger than the external diameter of the joining end portions 55 and 55 of the deformable sections 36a and 36b.

The rib 62 forms an annular shape and has an internal diameter slightly larger than the external diameter of the trunk portion 61. The rib 62 is attached to an axial central position of an outer circumferential surface of the trunk portion 61. Accordingly, the rib 62 protrudes outward in the diameter direction from the trunk portion 61. As illustrated in FIG. 4(b), the rib 62 is joined to the outer circumferential surface of the trunk portion 61 by fillet welding over the whole circumference on respective inner circumferential sides of both axial end surfaces thereof, and is integrated with the trunk portion 61. In addition, as illustrated in FIG. 2, the trunk portion 61 of the main body section 37 is provided with an attachment portion 63 for attaching a sensor or the like thereto. As the main body section 37 is formed with the rib 62, the strength (modulus of section) of the trunk portion 61 is improved.

Each of the flow guides 32a and 32b form a tubular shape, and as illustrated in FIGS. 4(a) and 4(c), has a flow guide main body 66 and a joining member 67. The flow guide main body 66 forms a cylindrical shape, and the external diameter thereof is smaller than the minimum internal diameters of the deformable sections 36a and 36b. The joining member 67 forms an annular shape, and the external diameter thereof is slightly smaller than the internal diameter of the connecting section main body 40 and the internal diameter of the trunk portion 61 of the main body section 37. Additionally, the internal diameter of the joining member 67 is slightly larger than the external diameter of the flow guide main body 66. The joining member 67 is fixed to one axial end of the flow guide main body 66 on an inner circumferential side thereof.

Figure 4:
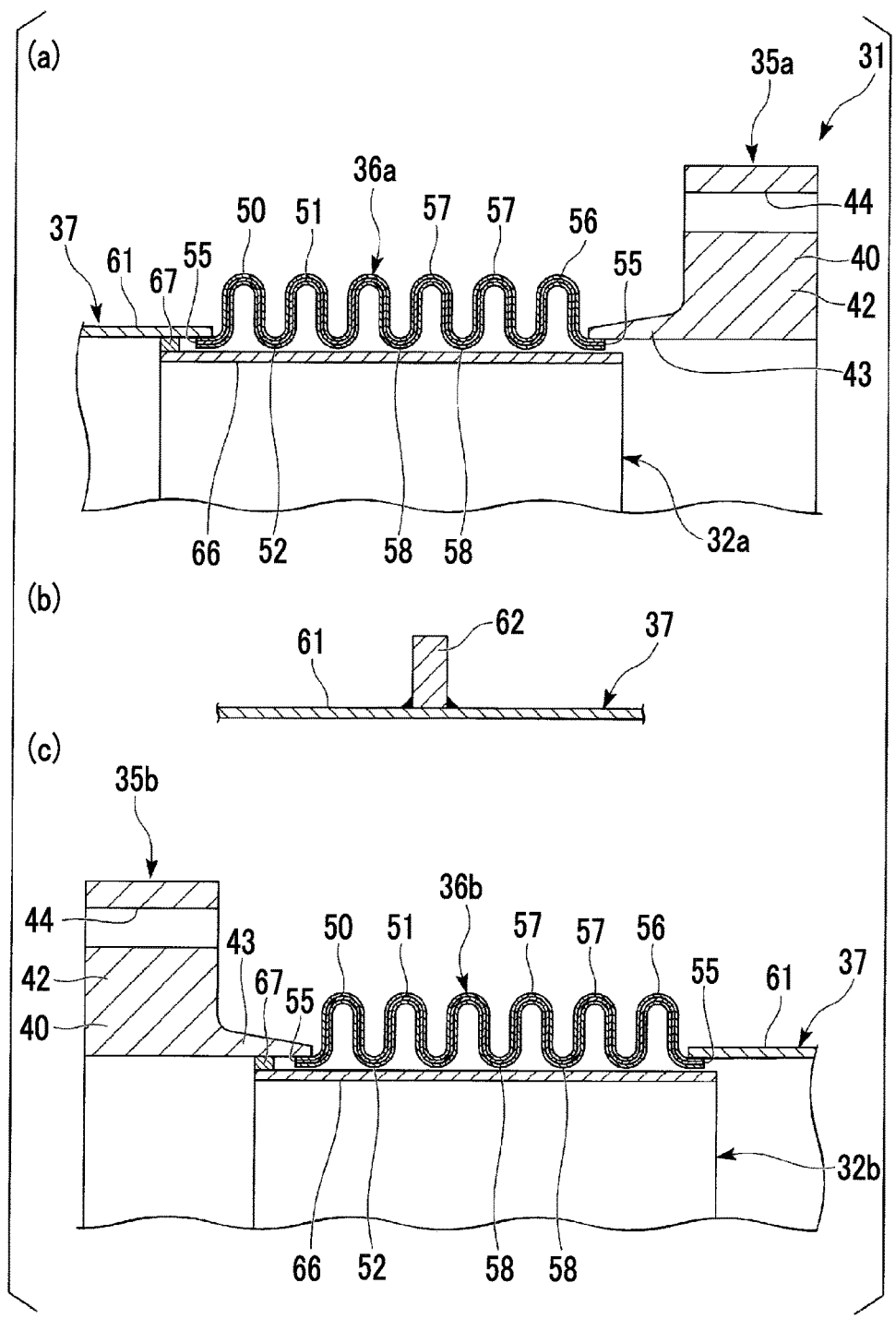
FIG. 4 are partially enlarged cross-sectional views illustrating the connecting piping related to the embodiment, and FIG. 4(*a*) illustrates portion A of FIG. 2, FIG. 4(*b*) illustrates portion B of FIG. 2, and FIG. 4(*c*) illustrates portion C of FIG. 2.

As illustrated in FIG. 4 (a), a joining end portion 55 of one end of the deformable section 36a is joined to an inner circumferential surface of the tubular portion 43 of the connecting section 35a by welding. A joining end portion 55 of the other end of the deformable section 36a is joined to an inner circumferential surface of one end of the trunk portion 61 of the main body section 37 by welding. As illustrated in FIG. 4(c), the joining end portion 55 of one end of the deformable section 36b is joined to an inner circumferential surface of the other end of the trunk portion 61 by welding. The joining end portion 55 of the other end of the deformable section 36b is joined to an inner circumferential surface of the tubular portion 43 of the connecting section 35b, by welding. Accordingly, the deformable sections 36a and 36b are provided on both sides of the main body section 37 in the axial direction. In other words, the deformable sections 36a and 36b are arranged in series with the main body section 37 therebetween.

As illustrated in FIG. 4(a), the flow guide 32a is joined to the inner circumferential surface of the trunk portion 61 of the main body section 37 on the deformable section 36a side in the joining member 67 by welding. In this state, the flow guide main body 66 of the flow guide 32a is arranged inside the deformable section 36a. The flow guide 32a is only fixed to the main body section 37, and hence, is fixed to the connecting piping main body 31 on only one side in the axial direction.

As illustrated in FIG. 4(c), the flow guide 32b is joined to the inner circumferential surface of the tubular portion 43 of the connecting section 35b, in the joining member 67 by welding. In this state, the flow guide main body 66 of the flow guide 32b is arranged inside the deformable section 36b. The flow guide 32b is only fixed to the connecting section 35b, and hence, is fixed to the connecting piping main body 31 on only one side in the axial direction.

In addition, as illustrated in FIG. 2, in the connecting sections 35a and 35b, the phases of the fixing holes 46 and 46 of the fixing plate sections 41 and 41 are aligned with each other in respective circumferential directions. The connecting sections 35a and 35b, are coupled together by a fixture 70 inserted through the fixing holes 46 and 46 of which the phases are aligned. Accordingly, the relative movement of the connecting sections 35a and 35b, in any one direction of the axial direction, the diameter direction, and the circumferential direction is also regulated. In addition, the coupling between the connecting sections 35a and 35b by the fixture 70 is provided for reducing the load of the respective sections (portions) when carrying the connecting piping 10. Therefore, the fixture 70 is detached after the connecting piping 10 is assembled into the steam turbine system 11 illustrated in FIG. 1.

As illustrated in FIG. 1, the connecting piping 10 connects the steam turbine 12 with the condenser 13. In this case, in the connecting piping 10, the connecting seat 42 of the connecting section 35b is fixed to the connecting flange section 23 of the turbine duct 21 of the steam turbine 12. Additionally, in the connecting piping 10, the connecting seat 42 of the connecting section 35a is fixed to the connecting flange section 28 of the condenser duct 26 of the condenser 13. In this state, the connecting piping 10 is brought into a state where the connecting section 35b, the deformable section 36b, the main body section 37, the deformable section 36a, and the connecting section 35a are sequentially arranged from above. Additionally, in this state, the respective diameter directions of the connecting section 35a, the deformable section 36a, the main body section 37, the deformable section 36b, and the connecting section 35b run along a lateral direction, and the respective axial directions thereof run along a vertical direction.

The steam exhausted from the turbine duct 21 of the steam turbine 12 passes through the connecting piping 10, and is introduced into the condenser duct 26 of the condenser 13. That is, the connecting piping 10 connects the steam turbine 12 with the condenser 13, allowing the relative displacement thereof, and serves as an exhaust steam expansion joint that introduces the steam exhausted from the steam turbine 12 into the condenser 13.

In the connecting piping 10, if the connecting flange section 23 of the turbine duct 21 and the connecting flange section 28 of the condenser duct 26 are relatively displaced in the vertical direction, the deformable sections 36a and 36b are deformed in the axial direction to absorb this relative displacement. In the connecting piping 10, if the connecting flange section 23 of the turbine duct 21 and the connecting flange section 28 of the condenser duct 26 are relatively displaced in the lateral direction, the deformable sections 36a and 36b are deformed in the diameter direction to absorb this relative displacement. In addition, although relative displacement is proportional to a spring constant and occurs as a reaction force on the turbine or condenser side, the spring coefficient is reduced because the multilayer structure is adopted. Therefore, there is an effect that the reaction force generated on the turbine or condenser side can be markedly reduced. Additionally, since the steam turbine system 11 installed in marine structures requires absorption of an extremely large amount of relative displacement due to deflection of the ship hull 14 or the platform section 15, rocking of the marine structures, or the like compared to those that are installed on land, a reaction force is inevitably larger. However, the present structure is very effective in the reduction of this reaction force.

The connecting piping 10 of the above-described embodiment has the tubular main body section 37 that has the annular rib 62 provided on the outer circumferential surface thereof. Additionally, the connecting piping 10 includes the deformable sections 36a and 36b constituted of the bellows 50 to 52 that are deformable in the axis line direction and the diameter direction. By virtue of such a configuration, the connecting piping 10 can suppress cost increase compared to a configuration in which a connecting piping includes deformable sections consisting of bellows over their entire length, can reduce a reaction force caused by the connecting piping 10, which is applied to the steam turbine 12 and the condenser 13, and can also reduce the stress of the deformable sections 36a and 36b themselves. Particularly, as the length of the connecting piping 10 becomes larger, a cost increase suppressing effect becomes higher. Additionally, the annular rib 62 is provided on the outer circumferential surface of the main body section 37. For this reason, the weight of the main body section 37 can be reduced by reducing the thickness (for example, 8 mm) of the trunk portion 61 while securing the rigidity of the main body section 37. That is, since the inside of the main body section 37 has a negative pressure and the outside of the main body section has the atmospheric pressure, a load is applied to the inside in the diameter direction. In contrast, even if the weight of the main body section 37 is reduced by reducing the thickness of the trunk portion 61, the rigidity of the main body section 37 can be ensured by the rib 62, and deformation caused by the atmospheric pressure can be prevented. When the connecting piping 10 is arranged in a vertical orientation as described above, the main body section 37 applies a tensile load to the upper deformable section 36b. Additionally, the main body section 37 applies a compressive load to the lower deformable section 36a. By reducing the weight of the main body section 37, the load applied to the deformable sections 36a and 36b can be reduced.

Additionally, the deformable sections 36a and 36b are configured such that a plurality of the bellows 50 to 52 overlap each other in the diameter direction. For this reason, the connecting piping 10 can ensure the strength of the deformable sections 36a and 36b, even if the deformation volumes of the deformable sections 36a and 36b become large. That is, the connecting piping 10 can suppress the fatigue fracture caused in the deformable sections 36a and 36b while absorbing a relative high amount of displacement that repeatedly occurs between the connecting seats 42 and 42 of both ends compared to a single-layer bellows. Hence, the steam turbine 12 and the condenser 13 in which the connecting flange section 23 and the connecting flange section 28 may be displaced as the state of thermal expansion changes can be connected together with s high level of reliability by the connecting piping 10. Additionally, in the steam turbine system 11 installed in marine structures, the connecting flange section 23 and the connecting flange section 28 of the steam turbine 12 and the condenser 13 are more highly displaced and repeatedly displaced a number of times due to deflection of the ship hull 14 or the platform section 15, rocking of the marine structures, or the like compared to those that are installed on land. In the single-layer structure as in the related art, there are problems in that the reaction force becomes large and the cyclic strength becomes small. However, in the invention, the reduction of the reaction force and higher cyclic strength can be realized, and it is possible to simultaneously solve the above two problems that are posed in steam turbine systems installed in marine structures. Therefore, even in such a steam turbine system 11, the steam turbine 12 and the condenser 13 can be connected together with a high level of reliability by the connecting piping 10. Particularly, when the connecting piping 10 is arranged in the vertical orientation as mentioned above, the displacement between the connecting flange section 23 and the connecting flange section 28 in the lateral direction becomes large due to deflection of the ship hull 14, the platform section 15, or the like. Even if there is high displacement in such a lateral direction, the steam turbine 12 and the condenser 13 can be connected together with a high level of reliability by the connecting piping 10.

Additionally, in the connecting piping 10, the deformable sections 36a and 36b are provided on both sides of the main body section 37. For this reason, the deformation volume of each of the deformable sections 36a and 36b can be reduced by half. That is, the connecting piping 10 can further suppress the fatigue fracture caused in the deformable sections 36a and 36b while absorbing relative high displacement between the connecting seats 42 and 42 at both ends thereof. Therefore, the steam turbine 12 and the condenser 13 can be excellently connected together with higher reliability by the connecting piping 10. Additionally, even in such a steam turbine system 11 installed in marine structures, the steam turbine 12 and the condenser 13 can be connected together with a high level of reliability by the connecting piping 10. Moreover, even when the connecting piping 10 is arranged in the vertical orientation as described above and when the displacement between the connecting flange section 23 and the connecting flange section 28 in the lateral direction becomes large, the steam turbine 12 and the condenser 13 can be connected together with a high level of reliability by the connecting piping 10. In addition, in the connecting piping 10, the two deformable sections 36a and 36b are arranged in series as described above, on the basis of the relationship between the distance and the relative displacement volume between the connecting seats 42 and 42 at both ends of the connecting piping 10 and the spring constant of the deformable sections 36a and 36b. The relationship between a load. F applied to the steam turbine 12 and the condenser 13 of the connecting piping 10, the spring constant K of the deformable sections 36a and 36b, and the allowable displacement X of the connecting piping 10 satisfies F=K*X. The load F and the spring constant K are made small, and the allowable displacement X is made large. The optimum combination of the spring constant of the deformable sections 36a and 36b and the weight of the main body section 37 is selected so as to satisfy this condition.

Additionally, in the connecting piping 10, the tubular flow guides 32a and 32b are provided inside the deformable sections 36a and 36b. For this reason, the flow of steam can be kept from being disturbed by the deformable sections 36a and 36b. Additionally, erosion caused in the deformable sections 36a and 36b can be suppressed.

Additionally, in the connecting piping 10, the flow guides 32a and 32b are only fixed to the connecting piping main body 31 including the main body section 37 and the deformable sections 36a and 36b on only one side in the axial direction. Accordingly, even if the flow guides 32a and 32b are provided, the deformable sections 36a and 36b can be smoothly deformed.

The steam turbine system 11 of the above-described embodiment has the steam turbine 12, and the condenser 13 into which the steam discharged from the steam turbine 12 flows. Additionally, the steam turbine 12 and the condenser 13 are connected together by the above-described connecting piping 10. By virtue of such a configuration, the steam turbine 12 and the condenser 13 can be connected together with a high level of reliability by the connecting piping 10. Additionally, even in the steam turbine system 11 installed in marine structures, the steam turbine 12 and the condenser 13 can be connected together with a high level of reliability by the connecting piping 10.

In addition, it should be understood that the invention is not limited to the above-described embodiment, but various modifications may be made to the above-described embodiment without departing from the spirit of the invention. That is, the specific shapes, configurations, or the like mentioned in the embodiment are merely examples, and can be appropriately changed.

For example, the connecting section 35a, the deformable section 36a, the main body section 37, the deformable section 36a, the main body section 37, the deformable section 36b, and the connecting section 35b, may be arranged in series in this order. That is, there may be provided a connecting piping having a plurality of body sections, a deformable section provided between the main body sections adjacent to each other, and deformable sections that are respectively provided on the outside of the main body section at both ends of the connecting piping.

Additionally, for example, a plurality of the ribs 62 may be provided at intervals in the axial direction in the main body section 37. That is, at least one annular rib 62 may be provided on the outer circumferential surface of the main body section 37.

Additionally, for example, the deformable sections 36a and 36b may have multilayer structures other than the three-layer structure consisting of the three bellows 50 to 52. Additionally, the connecting piping 10 may have shapes other than the cylindrical shape, such as angular shapes.

INDUSTRIAL APPLICABILITY

The invention can be widely applied to connecting pipings in which relative displacement occurs at connecting positions at both ends of the connecting pipings, and steam turbine systems using the connecting pipings.

REFERENCE SIGNS LIST

10: CONNECTING PIPING
11: STEAM-TURBINE SYSTEM
12: STEAM TURBINE

13: CONDENSER
32a, 32b: FLOW GUIDE
36a, 36b: DEFORMABLE SECTION
37: MAIN BODY SECTION
40: CONNECTING SECTION MAIN BODY
50 to 52: BELLOWS
62: RIB

The invention claimed is:

1. A connecting piping comprising:
    a tubular main body section that is provided with at least one annular rib on an outer circumferential surface; and
    a pair of deformable sections that are each configured from a bellows (See FIG. 4b: as shown) that is deformable in an axis line direction and a diameter direction; and
    a pair of connecting sections, wherein
    a flow guide is provided inside each deformable section,
    the flow guide in said each deformable sections is fixed on only one side in an axial direction to a connecting piping main body including the tubular main body section, the deformable sections, and the pair of connecting sections,
    the flow guide provided inside one of the deformable sections is fixed to the tubular main body section, and
    the flow guide provided inside the other of the deformable sections is fixed to the connecting section.

2. The connecting piping according to claim 1, wherein the deformable sections are configured such that a plurality of the bellows overlap each other in the diameter direction.

3. The connecting piping according to claim 1, wherein the deformable sections are provided on both sides of the tubular main body section.

4. A steam turbine system having the connecting piping according to claim 1, the steam turbine system comprising:
    a steam turbine; and
    a condenser into which steam discharged from the steam turbine flows,
    wherein the steam turbine and the condenser are connected together by the connecting piping.

5. The connecting piping according to claim 2, wherein the deformable sections are provided on both sides of the tubular main body section.

6. A steam turbine system having the connecting piping according to claim 2, the steam turbine system comprising:
    a steam turbine; and
    a condenser into which steam discharged from the steam turbine flows,
    wherein the steam turbine and the condenser are connected together by the connecting piping.

7. A steam turbine system having the connecting piping according to claim 3, the steam turbine system comprising:
    a steam turbine; and
    a condenser into which steam discharged from the steam turbine flows,
    wherein the steam turbine and the condenser are connected together by the connecting piping.

* * * * *